US009366194B2

(12) United States Patent  
Feigl et al.

(10) Patent No.: US 9,366,194 B2
(45) Date of Patent: Jun. 14, 2016

(54) METHOD AND SYSTEM FOR CONTROLLING GAS TURBINE PERFORMANCE WITH A VARIABLE BACKFLOW MARGIN

(71) Applicant: General Electric Company, Schenectady, NY (US)

(72) Inventors: Markus Feigl, Simpsonville, SC (US); Gary Michael Itzel, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 320 days.

(21) Appl. No.: 14/018,668

(22) Filed: Sep. 5, 2013

(65) Prior Publication Data

US 2015/0059355 A1   Mar. 5, 2015

(51) Int. Cl.
*F02C 9/18* (2006.01)
*F02C 7/18* (2006.01)
*F02C 6/08* (2006.01)

(52) U.S. Cl.
CPC ... *F02C 9/18* (2013.01); *F02C 7/18* (2013.01); *F02C 6/08* (2013.01)

(58) Field of Classification Search
CPC ................ F02C 9/18; F02C 6/08; F02C 3/13; F02C 7/18
See application file for complete search history.

(56) References Cited

U.S. PATENT DOCUMENTS

| 6,385,958 B2 | 5/2002 | Leone et al. |
| 6,393,825 B1 | 5/2002 | Leone et al. |
| 6,615,574 B1 | 9/2003 | Marks |

FOREIGN PATENT DOCUMENTS

EP          1967717         9/2008

*Primary Examiner* — William H Rodriguez
(74) *Attorney, Agent, or Firm* — Ernest G. Cusick; Frank A. Landgraff

(57) ABSTRACT

A system and method for controlling the performance of a gas turbine system is provided. A backflow margin pressure ratio for a component is determined. A modified backflow margin pressure ratio for the component is calculated based on the number of fired hours and starts. Bleed air along a first flow path is controlled based on the modified backflow margin pressure ratio.

18 Claims, 5 Drawing Sheets

METHOD AND SYSTEM FOR CONTROLLING GAS TURBINE PERFORMANCE WITH A VARIABLE BACKFLOW MARGIN

BACKGROUND OF THE INVENTION

The subject matter disclosed herein generally relates to cooling and purge air flow systems for gas turbines and more particularly to the reduction of performance loss from cooling and purge air flow systems for gas turbines.

A conventional gas turbine system, includes a compressor section, a combustor section, and a turbine section. In a conventional gas turbine system, compressed air is provided from the compressor section to the combustor section. The air entering the combustor section is mixed with fuel and combusted. Hot gases of combustion flow from the combustor section to the turbine section to drive the gas turbine system and generate power. The turbine includes one or more stages of stator nozzles or vanes, rotor blades and annular shrouds around the turbine blades to maintain appropriate clearances.

A first turbine stage nozzle receives hot combustion gas from the combustor. The hot combustion gas is directed to the first turbine stage rotor blades to extract energy. A second turbine stage turbine nozzle may be disposed downstream from the first turbine stage rotor blades, and is followed by a row of second turbine stage rotor blades that extract additional energy from the combustion gas. Additional stages of turbine nozzles and turbine rotor blades may be disposed downstream from the second stage turbine rotor blades.

A cooling fluid such as air is provided to the turbine vanes, blades, and shrouds to maintain the temperatures of those components at appropriate levels to ensure a satisfactory useful life of the components. Cooling is typically accomplished by extracting a portion of the compressed air from the compressor and conducting it to the components of the turbine. The rotating blades include hollow airfoils that are supplied the cooling air through cooling circuits. The airfoils include a cooling cavity bounded by sidewalls that define the cooling cavity. Any air compressed in the compressor and not used in generating combustion gases will reduce the efficiency of the engine. Therefore, it is desirable to reduce the amount of cooling air bled from the compressor. Furthermore, the air used for cooling turbine components typically discharges from orifices or gaps in those components. That cooling air mixes with the combustion gases in the turbine and will also reduce engine efficiency for thermodynamic and aerodynamic reasons. Accordingly, while turbine efficiency increases as turbine inlet temperature increases, that increase in temperature also requires effective cooling of the heated components, and such cooling is effected in a manner so as not to forfeit the increased efficiency realized by the increased temperature.

The axial location or stage where the air is bled from the compressor is determined by the pressure required by the component or system to be serviced by that air. To ensure sufficiently high delivery pressure, in general, it is desirable to select the source with the highest possible pressure. However, bleeding air from the earliest possible stage of the compressor will increase compressor efficiency by reducing the amount of work invested in the extracted air. Therefore, it is desirable to achieve the highest possible system supply pressure from the earliest and the lowest pressure stage of the compressor.

Modern systems utilize variable extraction through modulation valves to provide the amount of flow required. The flow is determined based on needs for cooling, backflow margin (BFM), wheelspace temperature, and maximizing turndown.

Furthermore, the cooling air must be provided at suitable pressures and flow rates to not only adequately cool the turbine component(s), but to maintain an acceptable BFM. BFM is defined as the difference between the pressure of the coolant inside the airfoil and the local pressure of the combustion gases outside the airfoil. Sufficient BFM must be maintained to prevent ingestion of the hot combustion gases into the airfoil, and ensure continuous discharge of the coolant through the airfoils. An adequate BFM limits leakage of hot gases from the gas path. Loss of gases flowing along the gas path leads to a reduction in output from the gas turbine system and may cause damage to secondary flow/cooling components resulting from hot gas ingestion.

During operation of a gas turbine, the BFM requirement typically determines the required amount of air extracted from the compressor. Currently, the BFM is set based on a probabilistic study and is applied to a unit controller as a pressure ratio demand which is set as a constant value over the life of the turbine. This approach fails to take into account the variation in the BFM over the life cycle of the component. Consequently, the air pressure within the outer side wall cavity associated with the component may be higher than necessary, resulting in less than efficient operation.

BRIEF DESCRIPTION OF THE INVENTION

The disclosure provides a solution to the problem of controlling the operation of a gas turbine by taking into account the variation in the BFM over the life cycle of the component.

In accordance with one exemplary non-limiting embodiment, the invention relates to a method for controlling the performance of a gas turbine system having a compressor, a combustor and a turbine. The method includes determining a BFM pressure ratio for a component of the turbine. A modified BFM pressure ratio for the component based on a number of fired hours and starts is then determined. The method selectively extracts a stream of bleed air from a stage of the compressor and flows at least a portion of the stream of bleed air through a first flow path from the compressor towards the component. The method further includes controlling the stream of bleed air along the first flow path to control selectively an air pressure at a cavity of the component based on the modified BFM pressure ratio.

In another embodiment, a system for controlling the performance of a gas turbine including a compressor, a combustor and a turbine is provided. The system includes a subsystem that calculates a hot flow gas path pressure for a turbine component having a predetermined life cycle. A subsystem that determines a BFM pressure ratio for the turbine component is also included. The system also includes a subsystem that determines a scalar as a function of fired hours and starts, and a subsystem that determines a modified BFM pressure ratio by multiplying the scalar with the BFM pressure ratio for the turbine component. A subsystem that extracts a stream of bleed air from a stage of the compressor; and a subsystem that controls the stream of bleed air to provide a component cavity pressure based on the modified BFM pressure ratio are also provided.

In another embodiment, a method for providing air from a compressor to at least one turbine component having a predetermined life cycle is provided. The method includes selectively extracting a stream of bleed air from the compressor; flowing the stream of bleed air to the at least one turbine component; and controlling the stream of bleed air flowing to the at least one turbine component according to an operating condition calculated from a modified BFM pressure ratio.

BRIEF DESCRIPTION OF THE DRAWINGS

Other features and advantages of the present invention will be apparent from the following more detailed description of the preferred embodiment, taken in conjunction with the accompanying drawings which illustrate, by way of example, the principles of certain aspects of the invention.

DETAILED DESCRIPTION OF THE INVENTION

Figure 1:
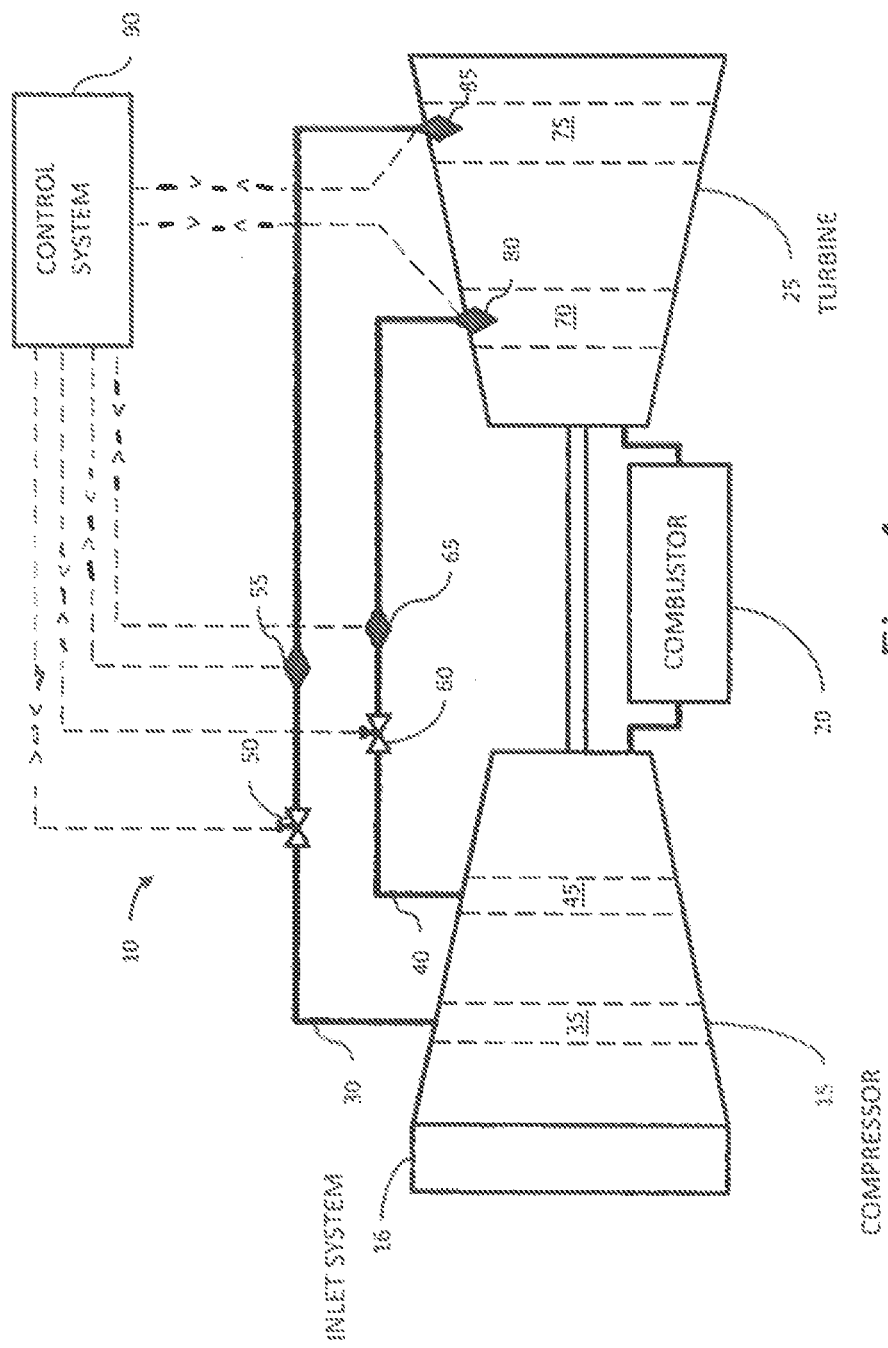
FIG. 1 is a schematic of a gas turbine with bleed air extraction.

Illustrated schematically in FIG. 1 is an exemplary gas turbine 10 used for powering, for example, an electric generator (not shown). The gas turbine 10 includes compressor 15 for compressing air, which is discharged from the compressor 15 at maximum pressure. An air inlet system 16 may be coupled to the compressor 15. The air inlet system 16 may include a housing supporting an array of filters that remove particulates from the inlet air stream. The air inlet system 16 removes moisture from the inlet air stream. The compressor 15 is an axial compressor and is provided with alternating rows of stator vanes and rotor blades (not shown) arranged in stages for sequentially compressing the air. Each succeeding downstream stage increases the pressure until the air is discharged from the compressor outlet at maximum pressure, referred to as the compressor discharge pressure $P_{cd}$. Combustor 20 receives the compressed outlet air from the compressor 15 where it is mixed with fuel and combusted to generate hot combustion gases.

Disposed downstream from the combustor 20 is a turbine 25 where the energy of the hot gases is converted into work. This conversion takes place in two steps. The hot gases are expanded, and a portion of the thermal energy is converted into kinetic energy in the nozzle section of the turbine 25. Then, in the bucket section of the turbine 25 a portion of the kinetic energy is transferred to the rotating buckets and converted to work. A portion of the work developed by the turbine 25 is used to drive the compressor 15, whereas the remainder is available to drive a load such as an electric generator. The turbine 25 thus has various components that are heated by the combustion gases, including the respective rows of stator nozzles or vanes and rotor blades that are arranged in a plurality of stages therein. As mentioned above, cooling air must be provided at suitable pressures and flow rates to cool these turbine components and to maintain an acceptable BFM.

Air may be extracted from various stages of the compressor 15 to provide cooling air to the turbine components. In this example, a lower pressure extraction conduit 30 may be coupled to a $9^{th}$ compressor stage 35 to extract a lower pressure stream of cooling air. A mid-pressure extraction conduit 40 may be coupled to the $13^{th}$ compressor stage 45 to extract a mid-pressure stream of cooling air. The lower pressure extraction conduit 30 may be provided with a lower pressure control valve 50 and a lower pressure extraction flow meter 55. The mid-pressure extraction conduit 40 may be provided with a mid-pressure control valve 60 and a mid-pressure extraction flow meter 65. Air from the mid-pressure extraction conduit 40 may flow into a plurality of stages of the turbine 25. In this example, air from the lower pressure extraction conduit 30 may flow into the second turbine stage 75 of the turbine 25, and air from the mid-pressure extraction conduit 40 may flow into the first turbine stage 70 of the turbine 25. A suitable first pressure transducer 80 and second pressure transducer 85 may be provided at the inlets to the first turbine stage 70 and the second turbine stage 75 respectively.

Lower pressure control valve 50 and mid-pressure control valve 60 may be coupled to a control system 90 which controls the lower pressure control valve 50 and mid-pressure control valve 60. The control system 90 may be part of a distributed or plant control system that operates a portion of or an entire plant. Mid-pressure extraction flow meter 65, lower pressure extraction flow meter 55, first pressure transducer 80, and second pressure transducer 85 may also be coupled to the control system 90. An example of a control system for a gas turbine 10 is the General Electric Company's Speedtronic™ Mark VI™ Control System, which is designed to fulfill all gas turbine control requirements, including speed and load control functions which act to control fuel flow under part-load conditions and temperature control which limits the fuel flow to a maximum consistent with achieving rated firing temperatures, and controls air flow via inlet guide vanes. The Mark VI™ control system also handles sequencing of the auxiliaries to allow fully automated start-up, shut-down and cool-down. Turbine protections against adverse operating conditions and annunciation of abnormal conditions are incorporated in the basic system. Thus, the control system performs many functions including fuel, air and emissions control, sequencing of turbine fuel and auxiliary for start-up, shut-down and cool-down, synchronization and voltage matching of generator and system, monitoring of all turbine, control and auxiliary functions, and protection against unsafe and adverse operating conditions. By performing these functions in an integrated manner, the desired pre-programmed and/or operator input control philosophy may be accomplished.

The pressures in the outer side wall cavities are controlled/modulated by the control system 90 so that desired cooling is provided and the appropriate BFM is maintained while minimizing excessive leakage.

As stated above, the BFM is conventionally set based on a probabilistic study and is applied to a unit controller as a pressure ratio demand (BFM pressure ratio) which is set as a constant value over the life of the turbine 25. In one embodiment, the BFM pressure ratio requirement and the component reliability are set based on the applicable failure modes and probability of occurrence of these failure modes. More effective control may be accomplished through the application of a scalar to the constant BFM pressure ratio. The scalar is defined as a function of fired hours and starts and accounts for the probability of a failure occurring in the life cycle of a part. With that approach, one has the tool to more effectively control performance for new units due to low probability of any failure mode being present at the beginning of the life cycle for a mature part design, and also control for reliability later in life when failure modes are more probable to occur. The scalar may be defined based on life analysis and predictions. The life analysis equations may employ any of various techniques known in the art for modeling the distribution curves of future conditions based on known data. The life analysis calculations may be based on a detailed geometric model of the component along with material deformation and damage rules and temperature information using computational fluid dynamics calculations. For example, the life analysis equations may use a Weibull-loglinear model, Weibull proportional hazard model, or lognormal-loglinear model. Weibull analysis relies on failure data for a population of components. If a complete data set is available (i.e., failure ages are known for each component within the population), statistical reliability analysis, such as Weibull analysis, can provide predictions, such as mean-time-to-failure for a particular component, percentages of components that will fail at a particular time or before a particular age, a statistical distribution of failure ages, and other statistical measures of component failures. The age of a particular component may be measured in fired hours or other cumulative performance measures such as fired starts.

The scalar is used as a factor that is multiplied with the desired end of life pressure ratio requirement of a turbine component. The resulting product is then compared to the ratio of the measured cavity pressure and an estimate of the hot gas pressure derived from an Adaptive Real-time Engine Simulation (ARES). ARES is a gas turbine model that receives measured conditions as input parameters, (e.g. ambient pressure, compressor inlet guide vane position, fuel flow, inlet bleed heat flow, generator power losses, inlet and exhaust duct pressure losses, compressor inlet temperature). The model generates estimated operating parameters, (e.g., exhaust gas temperature, compressor discharge pressure and temperature, and power output). The estimated operating parameters may be used in conjunction with the measured operating parameters to control the gas turbine 10. For example, the measured and estimated operating parameters may be input to control schedules to set the gas turbine operating state, (e.g., desired turbine exhaust temperature, total combustor fuel flow, fuel split schedules and inlet bleed heat flow). In addition, the measured and estimated operational parameters may be used to evaluate the accuracy of the model and to tune the model. The control system 90 will control the lower pressure control valve 50 and the mid-pressure control valve 60 to ensure that the component cavity pressure meets the commanded pressure ratio.

The technical effect is to provide better control of a gas turbine performance by controlling the operation of the gas turbine with a BFM pressure ratio adjusted for the life cycle conditions of relevant components. For example, a gas turbine 10 may require a BFM pressure ratio for the stage 2 nozzle (S2N) with a value of X. The BFM pressure ratio X may be established based on when the component meets its specified inspection and replacement cycle. A new gas turbine 10 may start out with a BFM pressure ratio requirement of Y (where Y<X). A scalar S can be derived such that Y=X*S. The scalar may be used to ramp up the pressure ratio requirement to X based on a predetermined number of fired hours and fired starts (dependent on failure modes). Thus, the scalar is a function of fired starts and fired hours (S=f(fired starts, fired hours)). Operating the gas turbine 10 at the modified BFM pressure ratio not only provides a better performance and bigger payback for the customer during the first stages of the operation, but also ensures that the reliability will not be impacted, and tolerances for potential cracks are increased for older parts.

The scalar may be defined in a table as a function of fired hours and fired starts. For example:

| Fired Hours | Commanded pressure ratio Fired Starts | | | |
|---|---|---|---|---|
| | 1 | 100 | 200 | 300 |
| 1 | S(1, 1) | — | — | — |
| 4,000 | S(1, 4,000) | — | — | — |
| 8,000 | S(1, 8,000) | S(100, 8,000) | — | — |
| 12,000 | S(1, 12,000) | S(100, 12,000) | S(200, 12,000) | — |
| 16,000 | S(1, 16,000) | S(100, 16,000) | S(200, 16,000) | S(300, 16,000) |
| 20,000 | S(1, 20,000) | S(100, 20,000) | S(200, 20,000) | S(300, 20,000) |
| 24,000 | S(1, 24,000) | S(100, 24,000) | S(200, 24,000) | S(300, 24,000) |

The table may be incorporated into a module 95 stored in control system 90. The table may be used as an input to calculate and modulate the outer side wall pressure for the component.

Figure 2:
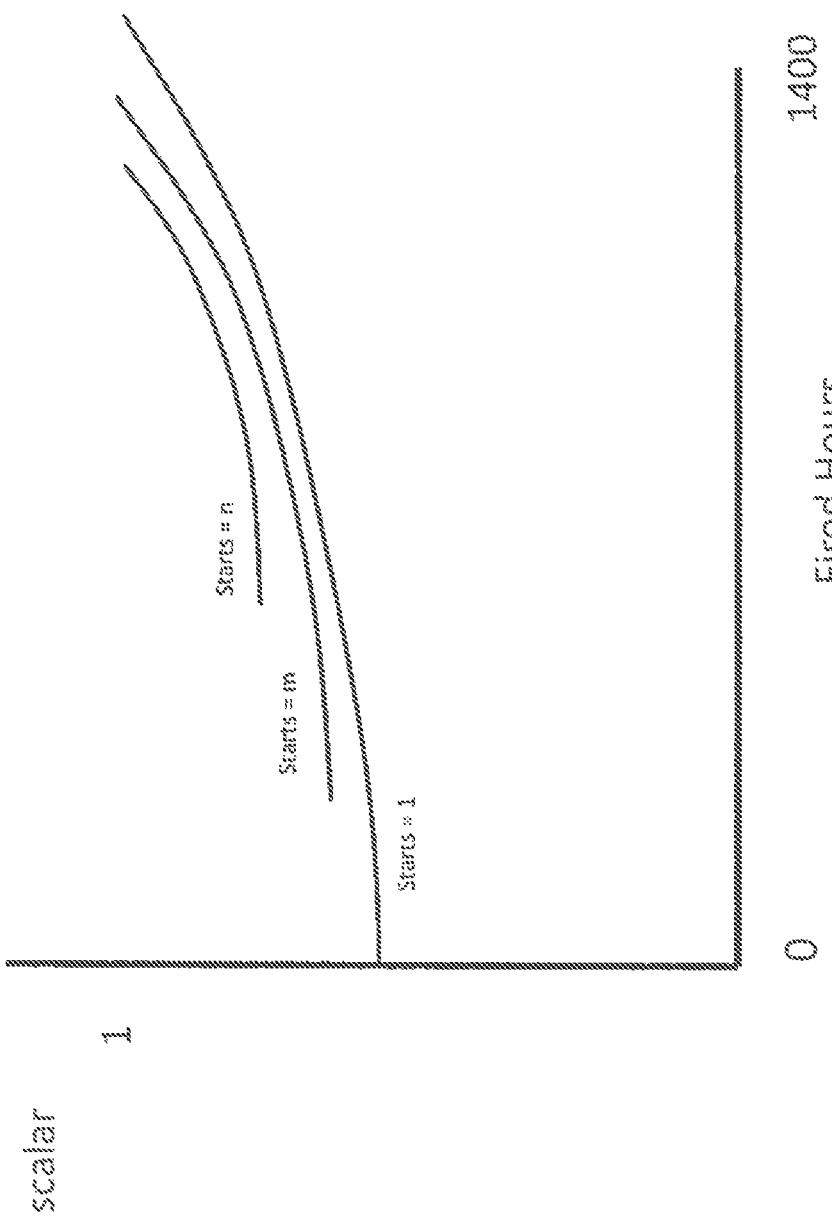
FIG. 2 is a chart illustrating a plot of an exemplary scalar versus fired hours.

FIG. 2 is a hypothetical graph illustrating an example plot of a representative scalar for a model gas turbine 10 as a function of fired hours for different fired starts. The graph shows how the scalar would vary depending on the number of fired hours and starts. The scalar would have a value of 1 when the component meets its specified inspection and replacement cycle. The commanded pressure ratio (BFM PR) would be:

$$\text{BFM PR (fired starts, fired hours)} = S(\text{fired starts, fired hours}) * \text{BFM PR}_{threshold},$$

where BFM $PR_{threshold}$ is a threshold value for the BFM pressure ratio for when the part will meet its specified inspection and replacement cycle, and S is the scalar.

Figure 3:
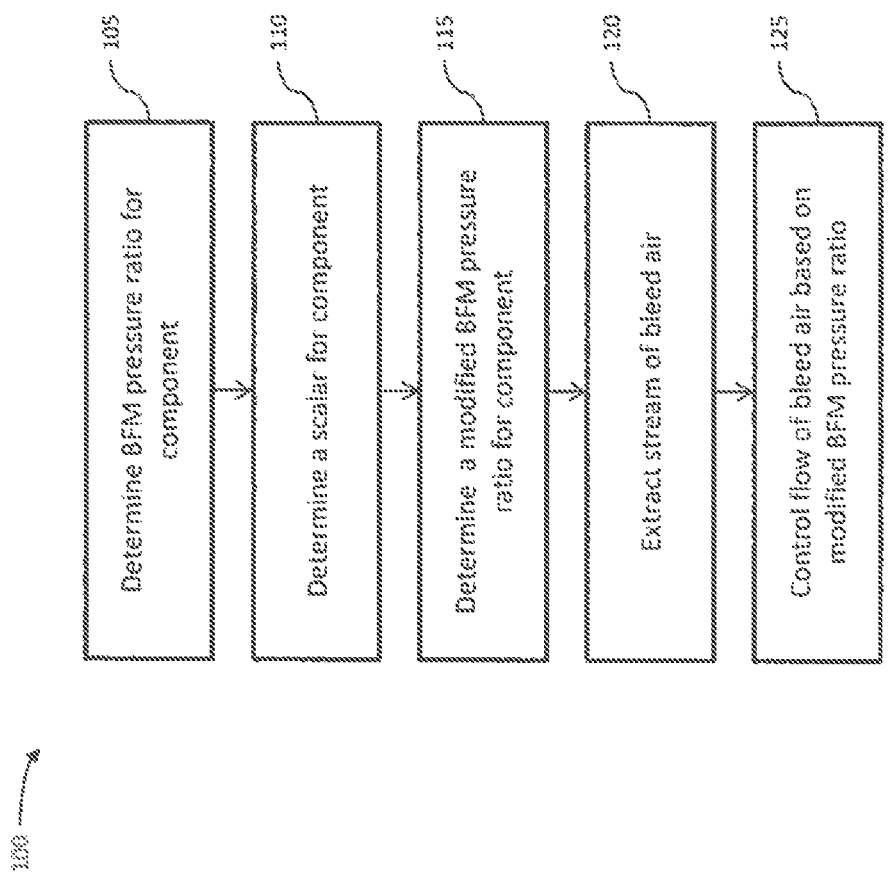
FIG. 3 is a flow chart of a method for controlling the performance of a gas turbine.

Illustrated in FIG. 3 is a method 100 for controlling the performance of a gas turbine 10 using a modified BFM pressure ratio.

In step 105, the method 100 determines a BFM pressure ratio for a component of the turbine 25.

In step 110, the method 100 determines a modified BFM pressure ratio for the component based on the number of fired hours and starts. The modified BFM pressure ratio is determined by multiplying a scalar with a BFM pressure ratio for the component. The scalar is derived from life analysis of the component, based on applicable failure modes and probability of occurrence of the failure modes.

In step 115, the method 100 selectively extracts a stream of bleed air from a stage of the compressor 15.

In step 120, the method 100 flows at least a portion of the stream of bleed air through a first flow path from the compressor 15 towards the component.

In step 125, the method 100 controls the flow of the stream of bleed air along the first flow path to control selectively an air pressure at a cavity of the component based on the modified BFM pressure ratio. The control is effected by estimating the hot flow path gas pressure for the component and determining a desired outer side wall cavity pressure to maintain the modified BFM pressure ratio. The stream of bleed air is then modulated to provide the bleed air at the desired outer side wall cavity pressure.

The method 100, may also include a step that determines a second modified BFM pressure ratio for a second component. Thereafter a step that selectively extracts a second stream of bleed air from a second stage of the compressor 15 and flows at least a portion of the stream of bleed air through a second flow path from the compressor 15 towards the second component may be provided. The method 100 may also include a step that controls the flow along the flow path to control selectively an air pressure at the second component of the turbine 25 based on the second modified BFM pressure ratio. A similar methodology may be applied to additional components.

With that approach, one has the tool to better control the performance for new units due to low probability of any failure mode being present at the beginning of the life cycle for a mature part design, and also take into account reliability later in life when failure modes are more probable to occur.

Figure 4:
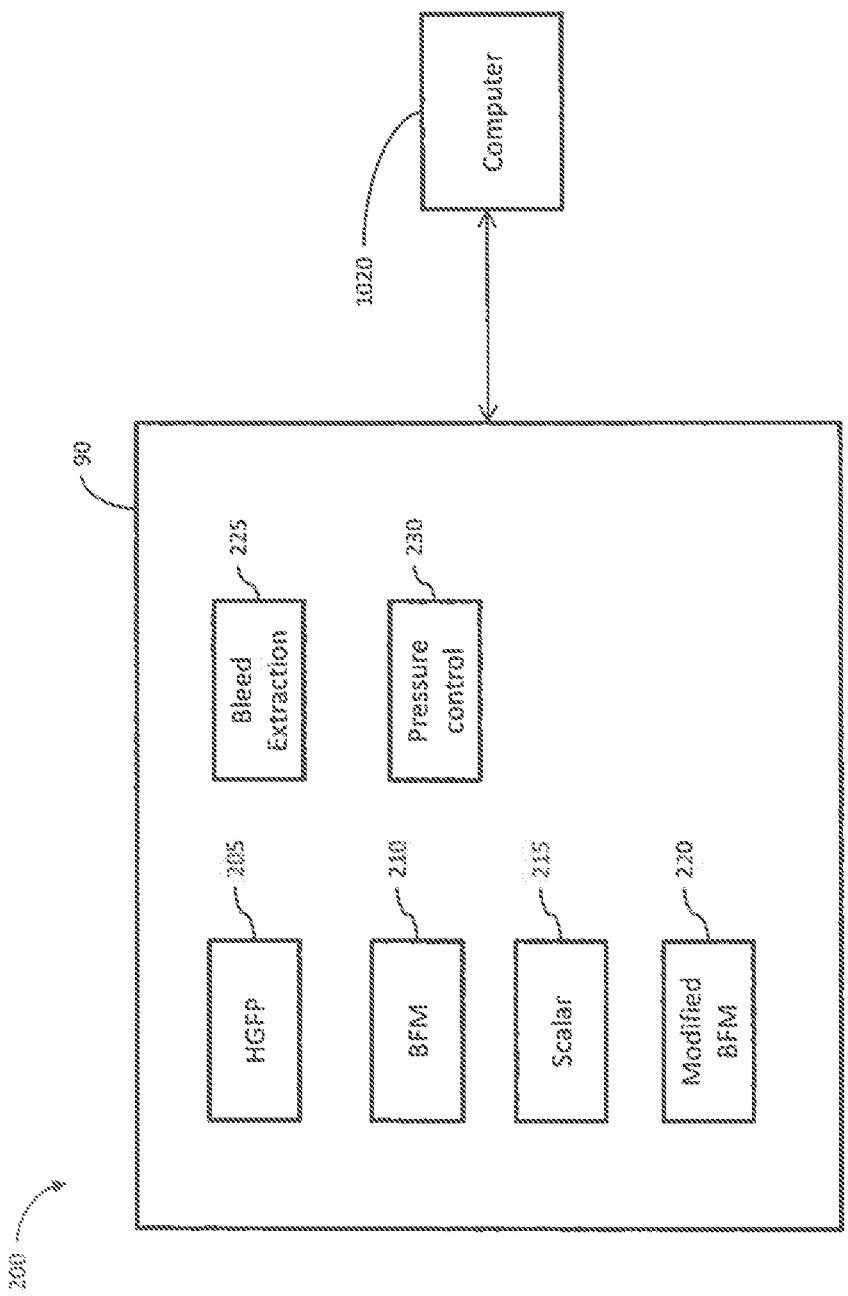
FIG. 4 is a schematic of a system for controlling the performance of a gas turbine.

Illustrated in FIG. 4 is a system 200 for controlling the performance of a gas turbine 10. The system 200 may be incorporated into the control system 90 that controls the operations of the gas turbine 10. The system 200 includes an HFGP subsystem 205 for calculating a hot flow gas path pressure for a turbine component, for example, derived from an ARES system. The system 200 may include a BFM pressure ratio subsystem 210 that determines a BFM pressure ratio for the turbine component based on a probabilistic study. The system 200 may include a scalar subsystem 215 that determines a scalar to be applied to the BFM pressure ratio. The scalar may be a function of fired hours and starts. The scalar for the component may be derived from life analysis of the component based on applicable failure modes and probability of occurrence of the failure modes and accounts for the probability of failure occurring during the predetermined life cycle of the component. The scalar may be formulated to have a value of 1 when the component is at an end of its life cycle. The system 200 may include a modified BFM subsystem 220 that determines a modified BFM pressure ratio by multiplying the scalar with the BFM pressure ratio for the component. The system 200 may include a bleed air extraction subsystem 225 that controls lower pressure control valve 50 and midpressure control valve 60 to extract a stream of bleed air from a stage of the compressor 15. The system 200 may also include a cavity pressure control subsystem 230 that controls the stream of bleed air to provide a component cavity pressure based on the modified BFM pressure ratio. The system 200 may include modules for controlling at least a second stream of bleed air from a second stage of the compressor 15 to be directed to a second turbine component. The modified BFM subsystem 220 may calculate a second modified BFM pressure ratio to be applied to the second component. The cavity pressure control subsystem 230 may control the flow of air into the cavity of the second component based on the second modified BFM pressure ratio. The system 200 may be implemented as a module in a computer 1020.

Figure 5:
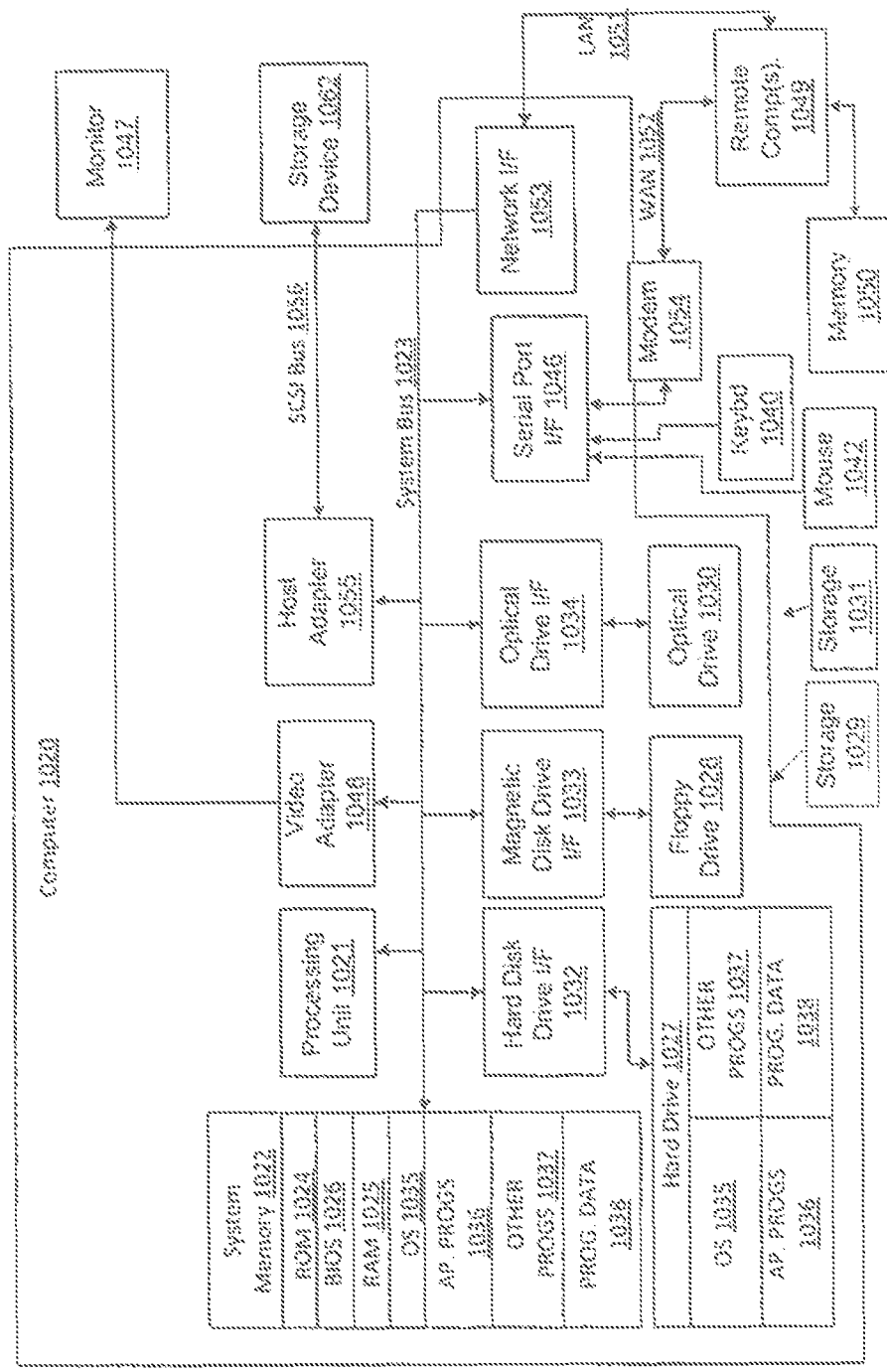
FIG. 5 is a block diagram of a general purpose computer system.

FIG. 5 is a block diagram of a computer 1020 in which the control system 90 may be incorporated. Computer 1020 includes a processing unit 1021, a system memory 1022, and a system bus 1023 that couples various system components including the system memory to the processing unit 1021. The system bus 1023 may be any of several types of bus structures including a memory bus or memory controller, a peripheral bus, and a local bus using any of a variety of bus architectures. The system memory includes read-only memory (ROM) 1024 and random access memory (RAM) 1025. A basic input/output system 1026 (BIOS), containing the basic routines that help to transfer information between elements within the computer 1020, such as during start-up, is stored in ROM 1024.

The computer 1020 may further include a hard disk drive 1027 for reading from and writing to a hard disk (not shown), a magnetic disk drive 1028 for reading from or writing to a removable magnetic disk 1029, and an optical disk drive 1030 for reading from or writing to a removable optical disk 1031 such as a CD-ROM or other optical media. The hard disk drive 1027, magnetic disk drive 1028, and optical disk drive 1030 are connected to the system bus 1023 by a hard disk drive interface 1032, a magnetic disk drive interface 1033, and an optical drive interface 1034, respectively. The drives and their associated computer-readable media provide nonvolatile storage of computer readable instructions, data structures, program modules and other data for the computer 1020. As described herein, computer-readable media is an article of manufacture and thus not a transient signal.

Although the exemplary environment described herein employs a hard disk, a removable magnetic disk 1029, and a removable optical disk 1031, it should be appreciated that other types of computer readable media, which can store data that are accessible by a computer, may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, removable magnetic disk 1029, removable optical disk 1031, ROM 1024 or RAM 1025, including an operating system 1035, one or more application programs 1036, other program modules 1037 and program data 1038. A user may enter commands and information into the computer 1020 through input devices such as a keyboard 1040 and pointing device 1042. Other input devices (not shown) may include a microphone, joystick, game pad, satellite disk, scanner, or the like. These and other input devices are often connected to the processing unit 1021 through a serial port interface 1046 that is coupled to the system bus 1023, but may be connected by other interfaces, such as a parallel port, game port, or universal serial bus (USB). A monitor 1047 or other type of display device is also connected to the system bus 1023 via an interface, such as a video adapter 1048. In addition to the monitor 1047, a computer may include other peripheral output devices (not shown), such as speakers and printers. The exemplary system of FIG. 5 also includes a host adapter 1055, a Small Computer System Interface (SCSI) bus 1056, and an external storage device 1062 connected to the SCSI bus 1056.

The computer 1020 may operate in a networked environment using logical connections to one or more remote computers, such as a remote computer 1049. The remote computer 1049 may be a personal computer, a server, a router, a network PC, a peer device or other common network node, and may include many or all of the elements described above relative to the computer 1020, although only a memory storage device 1050 has been illustrated in FIG. 5. The logical connections depicted in FIG. 5 include a local area network (LAN) 1051 and a wide area network (WAN) 1052. Such networking environments are commonplace in offices, enterprise-wide computer networks, intranets, and the Internet.

When used in a LAN networking environment, the computer 1020 is connected to the LAN 1051 through a network interface or adapter 1053. When used in a WAN networking environment, the computer 1020 may include a modem 1054 or other means for establishing communication over the wide area network 1052, such as the Internet. The modem 1054, which may be internal or external, is connected to the system bus 1023 via the serial port interface 1046. In a networked environment, program modules depicted relative to the computer 1020, or portions thereof, may be stored in the remote memory storage device. It will be appreciated that the network connections shown are exemplary and other means of establishing a communication link between the computers may be used.

Computer 1020 may include a variety of computer readable storage media. Computer readable storage media may be any available media that can be accessed by computer 1020 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1020. Combinations of any of the above should also be included within the scope of computer readable media that may be used to store source code for implementing the methods and systems described herein. Any combination of the features or elements disclosed herein may be used in one or more embodiments.

Where the definition of terms departs from the commonly used meaning of the term, applicant intends to utilize the definitions provided below, unless specifically indicated.

The terminology used herein is for the purpose of describing particular embodiments only and is not intended to be limiting of the invention. Where the definition of terms departs from the commonly used meaning of the term, applicant intends to utilize the definitions provided herein, unless specifically indicated. The singular forms "a", "an" and "the" are intended to include the plural forms as well, unless the context clearly indicates otherwise. It will be understood that, although the terms first, second, etc. may be used to describe various elements, these elements should not be limited by these terms. These terms are only used to distinguish one element from another. The term "and/or" includes any, and all, combinations of one or more of the associated listed items. The phrases "coupled to" and "coupled with" contemplates direct or indirect coupling.

This written description uses examples to disclose the invention, including the best mode, and also to enable any person skilled in the art to practice the invention, including making and using any components or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements.

What is claimed:

1. A method for controlling a gas turbine having a compressor, a combustor and a turbine, the method comprising:
   determining a backflow margin pressure ratio for a component of the turbine;
   determining a modified backflow margin pressure ratio for the component based on a number of fired hours and starts;
   selectively extracting a stream of bleed air from a stage of the compressor;
   flowing at least a portion of the stream of bleed air through a first flow path from the compressor towards the component; and
   controlling the stream of bleed air along the first flow path to selectively control an air pressure at a cavity of the component based on the modified backflow margin pressure ratio,
   wherein determining a modified backflow margin pressure ratio comprises:
   determining a backflow margin pressure ratio for the component;
   determining a scalar; and
   determining a modified backflow margin pressure ratio comprising a product of the scalar and the backflow margin pressure ratio.

2. The method of claim 1 wherein the scalar is a function of fired hours and starts.

3. The method of claim 1, wherein the scalar is derived from life analysis of the component, based on applicable failure modes and probability of occurrence of the failure modes.

4. The method of claim 1, wherein controlling the stream of bleed air comprises:
   estimating a hot flow path gas pressure for the component;
   determining a desired outer side wall cavity pressure to maintain the modified backflow margin pressure ratio for the hot flow path gas pressure; and
   modulating the stream of bleed air to provide the stream of bleed air at the desired outer side wall cavity pressure.

5. The method of claim 1, wherein the scalar accounts for a probability of failure occurring in a life cycle of the component.

6. The method of claim 1, wherein the scalar has a value of 1 when the component is at an end of its life cycle.

7. The method of claim 1 further comprising:
   determining a second modified backflow margin pressure ratio for a second component;
   selectively extracting a second stream of bleed air from a second stage of the compressor;
   flowing at least a portion of the stream of bleed air through a second flow path from the compressor towards the second component; and
   controlling flow along the second flow path to selectively control an air pressure at the second component of the turbine based on the second modified backflow margin pressure ratio.

8. A system comprising:
   a compressor;
   a combustor;
   a turbine; and
   a subsystem comprising:
      a subsystem that calculates a hot flow gas path pressure for a turbine component having a predetermined life cycle;
      a subsystem that determines a backflow margin pressure ratio for the turbine component;
      a subsystem that determines a scalar as a function of fired hours and starts;
      a subsystem that determines a modified backflow margin pressure ratio by multiplying the scalar with the backflow margin pressure ratio for the turbine component;
      a subsystem that extracts a stream of bleed air from a stage of the compressor; and
      a subsystem that controls the stream of bleed air to provide a component cavity pressure based on the modified backflow margin pressure ratio.

9. The system of claim 8, wherein the subsystem that determines a scalar comprises a subsystem that determines a scalar for the turbine component derived from life analysis of the turbine component based on applicable failure modes and probability of occurrence of the failure modes.

10. The system of claim 8, wherein the scalar accounts for a probability of failure occurring during the predetermined life cycle of the turbine component.

11. The system of claim 8, further comprising:
    a load driven by the turbine;
    an air inlet system coupled to the compressor; and
    a distributed plant control system.

12. The system of claim 8, further comprising:
- a subsystem that selectively extracts a second stream of bleed air from a second stage of the compressor;
- a subsystem that flows at least a portion of the second stream of bleed air through a second flow path from the compressor towards a second component of the turbine;
- a subsystem that determines a second modified backflow margin pressure ratio for the second component; and
- a subsystem that controls a flow along the second flow path to selectively control an air pressure at a cavity of the second component based on the second modified backflow margin pressure ratio.

13. A method for providing air from a compressor to at least one turbine component having a predetermined life cycle, the method comprising:
- selectively extracting a stream of bleed air from the compressor;
- flowing the stream of bleed air to the at least one turbine component; and
- controlling the stream of bleed air flowing to the at least one turbine component according to an operating condition calculated from a modified backflow margin pressure ratio, wherein the modified backflow margin pressure ratio is a product of a scalar and a backflow margin pressure ratio for the at least one turbine component.

14. The method of claim 13, wherein the scalar is derived from a life analysis of the at least one turbine component.

15. The method of claim 13, wherein the scalar accounts for a probability of failure occurring during the predetermined life cycle of the at least one turbine component.

16. The method of claim 13, further comprising flowing a second stream of bleed air from the compressor to a second component and controlling the second stream of bleed air according to an operating condition calculated from a second modified backflow margin pressure ratio for the second component.

17. The method of claim 16, wherein the second modified backflow margin pressure ratio is a product of a second scalar and a second backflow margin for the second component.

18. The method of claim 17, wherein the second scalar is derived from a life analysis of the second component.

* * * * *